(12) United States Patent
Kurokawa

(10) Patent No.: US 9,868,465 B2
(45) Date of Patent: Jan. 16, 2018

(54) VEHICLE FRAME STRUCTURE

(71) Applicant: TOYOTA JIDOSHA KABUSHIKI KAISHA, Toyota-shi, Aichi-ken (JP)

(72) Inventor: Hiroyuki Kurokawa, Nisshin (JP)

(73) Assignee: TOYOTA JIDOSHA KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/030,288

(22) PCT Filed: Oct. 6, 2014

(86) PCT No.: PCT/JP2014/076715
§ 371 (c)(1),
(2) Date: Apr. 18, 2016

(87) PCT Pub. No.: WO2015/064311
PCT Pub. Date: May 7, 2015

(65) Prior Publication Data
US 2016/0236715 A1  Aug. 18, 2016

(30) Foreign Application Priority Data
Nov. 1, 2013  (JP) .................................. 2013-228598

(51) Int. Cl.
*B62D 21/15* (2006.01)
*B62D 25/04* (2006.01)
(Continued)

(52) U.S. Cl.
CPC ............. *B62D 21/15* (2013.01); *B62D 25/04* (2013.01); *B62D 25/14* (2013.01); *B62D 25/20* (2013.01);
(Continued)

(58) Field of Classification Search
CPC ...... B62D 21/15; B62D 21/152; B62D 25/04; B62D 29/001; B62D 29/005; B62D 29/04; B62D 29/041; B62D 29/043
(Continued)

(56) References Cited

U.S. PATENT DOCUMENTS 6,082,811 A    7/2000  Yoshida
2001/0039780 A1  11/2001  Matsuki et al.
(Continued)

FOREIGN PATENT DOCUMENTS

CN         103129616 A    6/2013
DE      102005043698 A1 *  3/2007  ........... B62D 29/001
(Continued)

OTHER PUBLICATIONS

English translation of DE 10 2005 043 698; retrieved May 1, 2017 via PatentTranslate located at www.epo.org.*

*Primary Examiner* — Jason S Daniels
(74) *Attorney, Agent, or Firm* — Oliff PLC

(57) ABSTRACT

A frame structure of a vehicle has: a frame member that is formed in a closed cross-sectional shape having plural first wall portions and plural first corner portions, and that configures a frame of a vehicle; and a reinforcing member that is made of a fiber reinforced resin, and that is formed in a closed cross-sectional shape having plural second wall portions and plural second corner portions, and that is disposed within the closed cross-sectional shape of the frame member such that the plural second corner portions contact the plural first wall portions or the plural first corner portions respectively, the plural second wall portions facing the plural first wall portions or the plural first corner portions respectively, forming plural closed cross-sectional shapes.

9 Claims, 12 Drawing Sheets

(51) Int. Cl.
  *B62D 29/04* (2006.01)
  *B62D 29/00* (2006.01)
  *B62D 25/20* (2006.01)
  *B62D 25/14* (2006.01)

(52) U.S. Cl.
  CPC ....... *B62D 25/2045* (2013.01); *B62D 29/005* (2013.01); *B62D 29/041* (2013.01); *B62D 29/043* (2013.01)

(58) Field of Classification Search
  USPC ................... 296/187.03, 187.09, 187.1, 205
  See application file for complete search history.

(56) References Cited

U.S. PATENT DOCUMENTS

2006/0005503 A1* 1/2006 Bladow .................. B62D 21/15
  156/130.7
2012/0043019 A1   2/2012 Belpaire
2013/0140850 A1   6/2013 Tyan et al.

FOREIGN PATENT DOCUMENTS

| DE | 102013222016 A1 * | 12/2014 | ............. B62D 25/04 |
|----|-------------------|---------|--------------------------|
| JP | H11-48780 A       | 2/1999  |                          |
| JP | 2001-310759 A     | 11/2001 |                          |
| JP | 2007-237944 A     | 9/2007  |                          |
| JP | 2008-126835 A     | 6/2008  |                          |
| JP | 2008-267393 A     | 11/2008 |                          |
| JP | 2009001238 A      | 1/2009  |                          |
| JP | 2012-046041 A     | 3/2012  |                          |
| JP | 2012-526014 A     | 10/2012 |                          |
| JP | 2015-000680 A     | 1/2015  |                          |
| JP | 2015-033895 A     | 2/2015  |                          |
| JP | 2015-044461 A     | 3/2015  |                          |

* cited by examiner

VEHICLE FRAME STRUCTURE

TECHNICAL FIELD

The present invention relates to a vehicle frame structure.

BACKGROUND ART

There are conventionally known vehicle frame member structures in which an internal frame member that has a closed cross-sectional structure is disposed at a curved portion of a vehicle frame member that is made to be a closed cross-sectional structure, and bending deformation, that arises at the curved portion due to input of load, is suppressed (see, for example, Japanese Patent Application Laid-Open (JP-A) No. 2008-126835).

SUMMARY OF INVENTION

Technical Problem

However, there is still room for improvement in structures that suppress bending deformation that arises at a vehicle frame member due to input of load.

Thus, an object of the present invention is to provide a frame structure of a vehicle that can suppress bending deformation that arises at a frame member due to input of load.

Solution to Problem

In order to achieve the above-described object, a vehicle frame structure of a first aspect relating to the present invention comprises: a frame member that is formed in a closed cross-sectional shape having a plurality of first wall portions and a plurality of first corner portions, and that configures a vehicle frame; and a reinforcing member that is made of a fiber reinforced resin, and that is formed in a closed cross-sectional shape having a plurality of second wall portions and a plurality of second corner portions, and that is disposed within the closed cross-sectional shape of the frame member such that the plurality of second corner portions contact the plurality of first wall portions or the plurality of first corner portions respectively, and the plurality of second wall portions facing the plurality of first wall portions or the plurality of first corner portions respectively forming a plurality of closed cross-sectional shapes.

In accordance with the first aspect relating to the present invention, the reinforcing member, that has a closed cross-sectional shape and has the plural second wall portions and the plural second corner portions, is disposed within the closed cross-sectional shape of the frame member that has the plural first wall portions and the plural first corner portions, in a state in which the plural second corner portions contact the plural first wall portions or the plural first corner portions, respectively. Closed cross-sectional shapes are formed respectively between the plural second wall portions and the plural first wall portions or the plural first corner portions. Accordingly, the strength (rigidity) of the frame member is improved by this reinforcing member. Accordingly, bending deformation that arises at the frame member due to input of load is suppressed.

A vehicle frame structure of a second aspect relating to the present invention is the vehicle frame structure of the first aspect wherein, as seen in a cross-section viewed from a length direction of the frame member, wall surfaces of the plurality of second wall portions, that face the plurality of first wall portions or the plurality of first corner portions respectively, are formed in shapes of curved surfaces that are recessed toward an inner side of the frame member.

In accordance with the second aspect relating to the present invention, as seen in a cross-section viewed from the length direction of the frame member, the wall surfaces of the plural second wall portions are formed in the shapes of curved surfaces that are recessed toward the inner side of the frame member. Accordingly, stress that is applied to the reinforcing member is dispersed easily, as compared with a case in which the wall surfaces of the plural second wall portions are not formed in the shapes of curved surfaces that are recessed toward the inner side of the frame member.

A vehicle frame structure of a third aspect relating to the present invention is the vehicle frame structure of the first or second aspect wherein, as seen in a cross-section viewed from a length direction of the frame member, wall surfaces of the plurality of first wall portions, that face the plurality of second wall portions respectively or that are contacted by the plurality of second corner portions respectively, are formed in shapes of curved surfaces that bulge-out toward outer sides of the frame member.

In accordance with the third aspect relating to the present invention, as seen in a cross-section viewed from the length direction of the frame member, the wall surfaces of the plural first wall portions are formed in the shapes of curved surfaces that bulge-out toward the outer sides of the frame member. Accordingly, the yield strength of the frame member with respect to bending deformation is improved, as compared with a case in which the wall surfaces of the plural first wall portions are not formed in the shapes of curved surfaces that bulge-out toward the outer sides of the frame member.

A vehicle frame structure of a fourth aspect relating to the present invention is the vehicle frame structure of any of the first through third aspects wherein a reinforcing rib, that connects the second wall portions that face one another or the second corner portions that face one another, is provided within the closed cross-sectional shape of the reinforcing member.

In accordance with the fourth aspect relating to the present invention, the reinforcing rib, that connects the second wall portions that face one another or the second corner portions that face one another, is provided within the closed cross-sectional shape of the reinforcing member. Accordingly, the yield strength of the reinforcing member with respect to bending deformation is improved.

A vehicle frame structure of a fifth aspect relating to the present invention is the vehicle frame structure of any of the first through fourth aspects wherein, as seen from a length direction of the frame member, partitioning wall ribs, that are near to or that abut at least the plurality of first corner portions respectively, are provided at wall surfaces of the plurality of second wall portions that face the plurality of first corner portions respectively.

In accordance with the fifth aspect relating to the present invention, as seen from the length direction of the frame member, partitioning wall ribs, that are near to or that abut at least the plural first corner portions respectively, are provided at the wall surfaces of the plural second wall portions. Accordingly, cross-sectional deformation of the first corner portions is suppressed by these partitioning wall ribs.

A vehicle frame structure of a sixth aspect relating to the present invention is the vehicle frame structure of any of the first through fifth aspects wherein orientations of fibers at the reinforcing member run along a length direction of the frame member.

In accordance with the sixth aspect relating to the present invention, the orientations of the fibers at the reinforcing member run along the length direction of the frame member. Accordingly, the yield strength of the frame member with respect to bending deformation is improved more by this reinforcing member.

A vehicle frame structure of a seventh aspect relating to the present invention is the vehicle frame structure of the fifth aspect wherein orientations of fibers at the partitioning wall ribs run along directions heading from the second wall portions toward the first corner portions.

In accordance with the seventh aspect, the orientations of the fibers at the partitioning wall ribs run along the directions heading from the second wall portions toward the first corner portions. Accordingly, the yield strength of the partitioning wall ribs with respect to bending deformation is improved, and due thereto, cross-sectional deformation of the first corner portions is suppressed more.

A vehicle frame structure of an eighth aspect relating to the present invention is the vehicle frame structure of any of the first through seventh aspects wherein the reinforcing member is structured by a first member and a second member that form a closed cross-sectional shape by being fit-together with one another.

In accordance with the eight aspect relating to the present invention, the reinforcing member is structured by the first member and the second member that form a closed cross-sectional shape by being fit-together with one another. Accordingly, the ability to incorporate the reinforcing member into the frame member is improved.

Further, a vehicle frame structure of a ninth aspect relating to the present invention comprises: a frame member that is formed in a closed cross-sectional shape, and that structures a frame of a vehicle; and a reinforcing member that is made of a fiber reinforced resin, and that is formed in a closed cross-sectional shape, and that is disposed within the closed cross-sectional shape of the frame member so as to contact wall portions or corner portions of the frame member, and that, together with the frame member, forms a plurality of closed cross-sectional shapes.

In accordance with the ninth aspect relating to the present invention, the reinforcing member that has a closed cross-sectional shape is disposed within the closed cross-sectional shape of the frame member, in a state of contacting the wall portions or the corner portions of the frame member, and plural closed cross-sectional shapes are formed between the frame member and the reinforcing member. Accordingly, the strength (rigidity) of the frame member is improved by this reinforcing member. Accordingly, bending deformation that arises at the frame member due to input of load is suppressed.

Advantageous Effects of Invention

As described above, in accordance with the first aspect relating to the present invention, bending deformation that arises at the frame member due to input of load can be suppressed.

In accordance with the second aspect relating to the present invention, stress that is applied to the reinforcing member can be dispersed easily.

In accordance with the third aspect relating to the present invention, the yield strength of the frame member with respect to bending deformation can be improved.

In accordance with the fourth aspect relating to the present invention, the yield strength of the reinforcing member with respect to bending deformation can be improved.

In accordance with the fifth aspect relating to the present invention, cross-sectional deformation of the first corner portions can be suppressed.

In accordance with the sixth aspect relating to the present invention, the yield strength of the frame member with respect to bending deformation can be improved more.

In accordance with the seventh aspect relating to the present invention, the yield strength of the partitioning wall ribs with respect to bending deformation can be improved, and cross-sectional deformation of the first corner portions can be suppressed more.

In accordance with the eighth aspect relating to the present invention, the ability to incorporate the reinforcing member into the frame member can be improved.

In accordance with the ninth aspect relating to the present invention, bending deformation that arises at the frame member due to input of load can be suppressed.

DESCRIPTION OF EMBODIMENTS

Embodiments of the present invention are described hereinafter in detail on the basis of the drawings. Note that, for convenience of explanation, arrow UP that is shown appropriately in the respective drawings is the vehicle body upward direction, arrow FR is the vehicle body frontward direction, and arrow OUT is a vehicle transverse direction outer side. Further, in the following description, when vertical, longitudinal, and left-right directions are used without being specified, they indicate the vertical of the vehicle body vertical direction, the longitudinal of the vehicle body longitudinal direction, and the left and right of the vehicle body left-right direction (the vehicle transverse direction). Moreover, although the left side of a vehicle 12 that is equipped with a frame structure 10 relating to the present embodiments is illustrated in the respective drawings, the right side of the vehicle 12 has left-right symmetry with respect thereto and is similar.

First Embodiment

Figure 1:
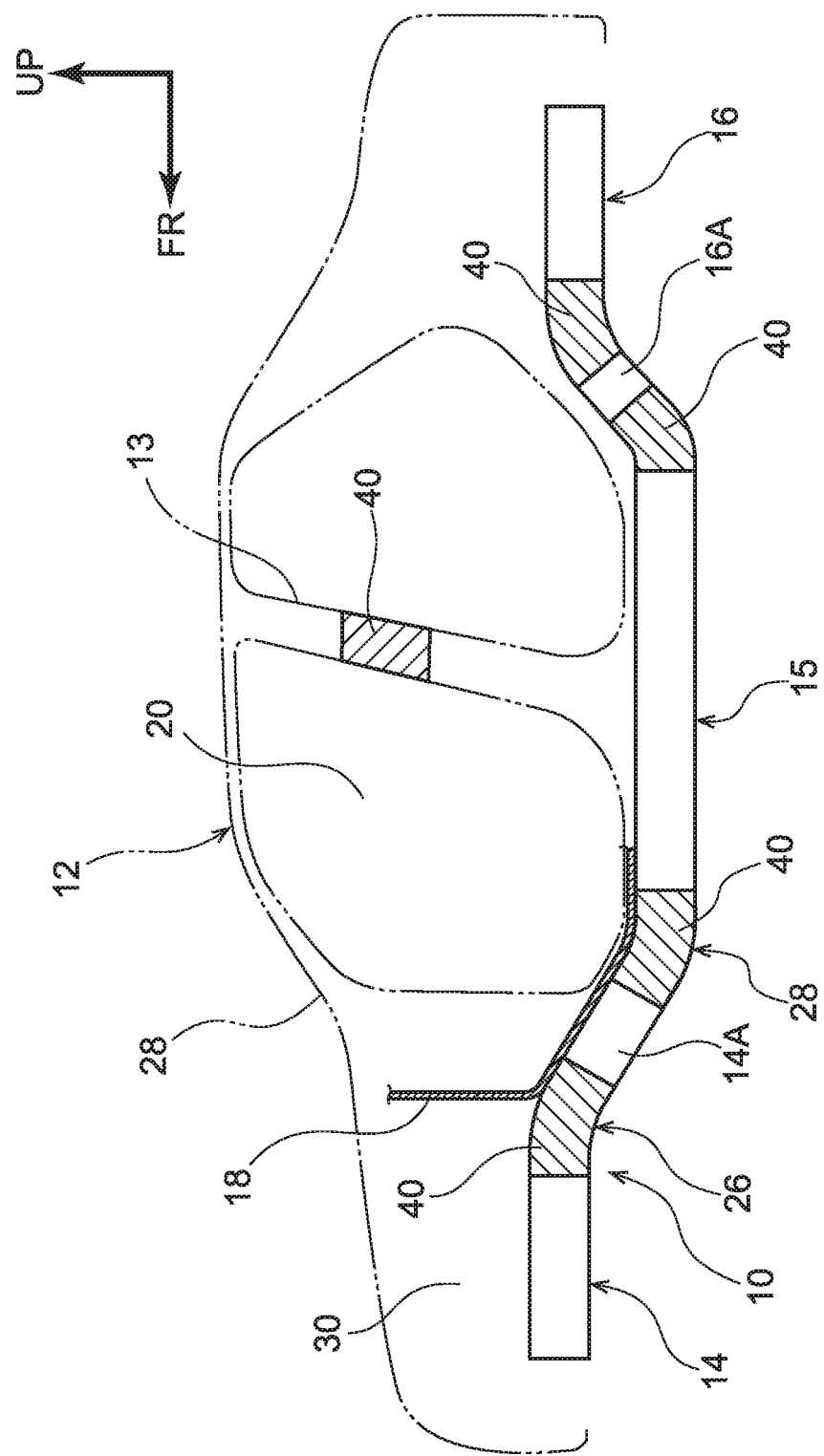
FIG. 1 is a side view showing the schematic structure of a vehicle that is equipped with frame structures relating to present embodiments.

First, the frame structure 10 of the vehicle 12 relating to the first embodiment is described. As shown in FIG. 1, a pair of left and right front side members 14, that serve as frame members having closed cross-sectional shapes and whose length directions are the vehicle body longitudinal direction, are disposed at the both side portions of the front portion of the vehicle 12. An inclined portion (kick portion) 14A is formed at a length direction midway portion of each of the front side members 14. The portion, that is further toward the vehicle body front side than the inclined portion 14A, of each of the front side members 14 extends in the vehicle body longitudinal direction at a position (a height position) that is a predetermined height higher than the vehicle body rear side.

Further, a pair of left and right rear floor side members 16, that serve has frame members having closed cross-sectional shapes and whose length directions are the vehicle body longitudinal direction, are disposed at the both side portions of the rear portion of the vehicle 12. An inclined portion (kick portion) 16A is formed at a length direction midway portion of each of the rear floor side members 16. The portion, that is further toward the vehicle body rear side than the inclined portion 16A, of each of the rear floor side members 16 extends in the vehicle body longitudinal direction at a position (a height position) that is a predetermined height higher than the vehicle body front side.

Note that the front side member 14 and the rear floor side member 16 are formed continuously and integrally via a floor member 15 that serves as a frame member having a closed cross-sectional shape and that extends in the vehicle body longitudinal direction. Further, because the frame structure 10 of the vehicle 12 at the rear floor side member 16 side is similar to the frame structure 10 of the vehicle 12 at the front side member 14 side, hereinafter, the frame structure 10 of the vehicle 12 at the front side member 14 side is described.

As shown in FIG. 1, a dash panel 18, that is substantially flat-plate-shaped and that extends along the upper surfaces of the inclined portions 14A of the front side members 14 and extends from the front end portions of these inclined portions 14A toward the vehicle body upward direction and that sections an engine compartment room 30 and a vehicle cabin 20, is provided at the vehicle 12.

Figure 2:
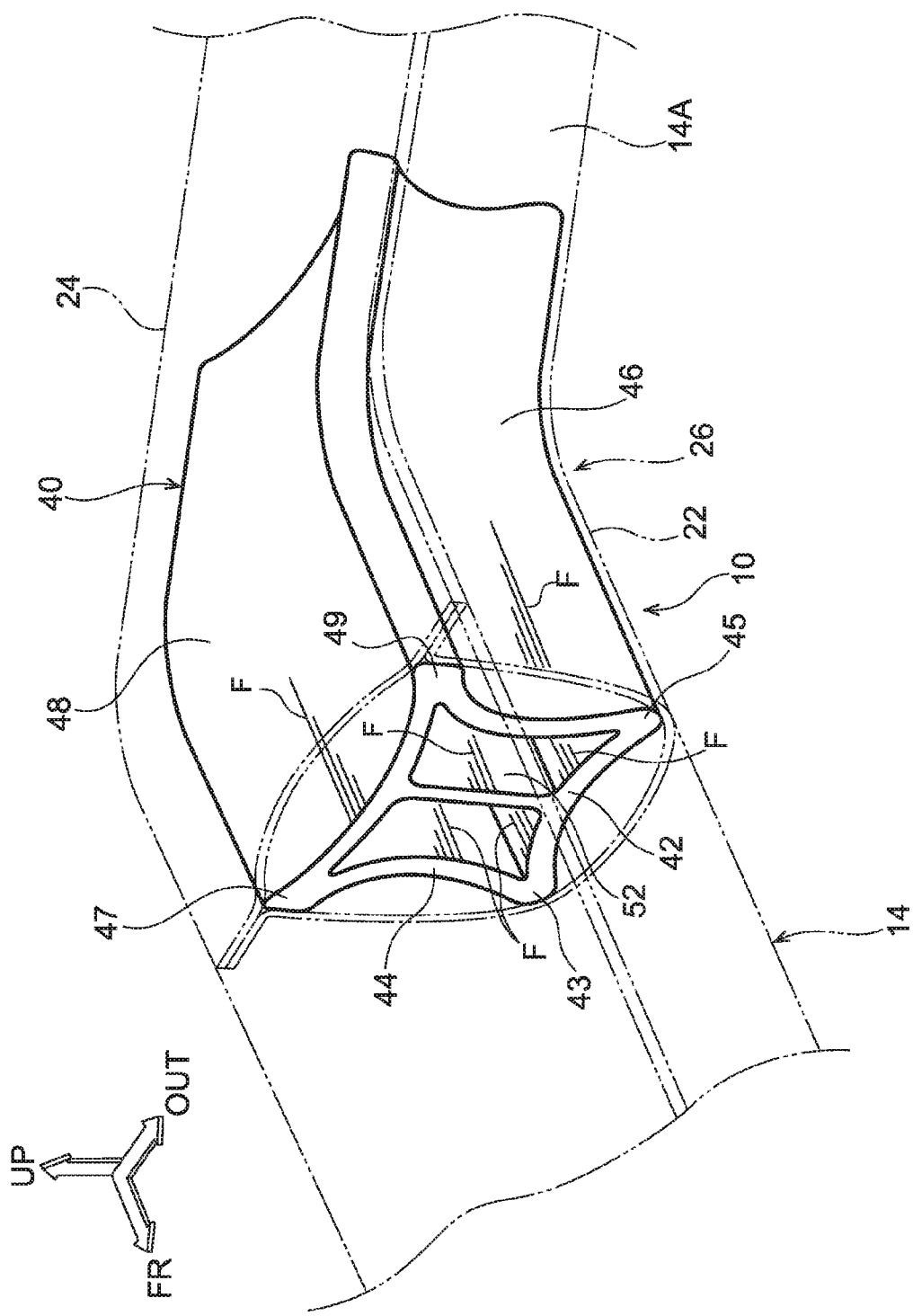
FIG. 2 is a perspective view showing a front side member and a reinforcing member relating to a first embodiment.
Figure 3:
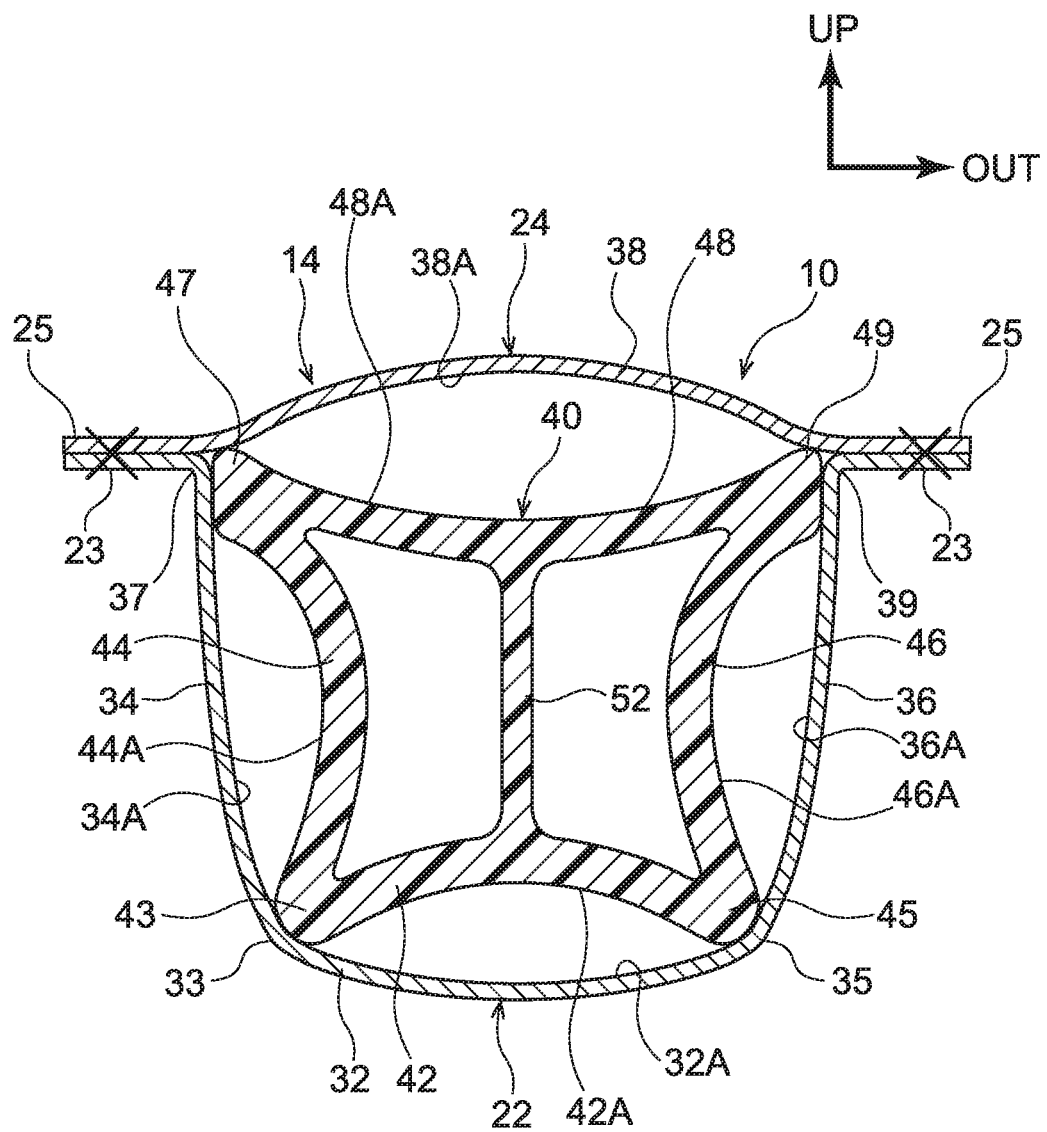
FIG. 3 is a cross-sectional view showing the front side member and the reinforcing member relating to the first embodiment.

Further, as shown in FIG. 2 and FIG. 3, the front side member 14 (including the inclined portion 14A) has an under member 22, that is formed from a steel plate or the like substantially in the shape of a hat in cross-section, and an upper member 24 that is formed from a steel plate or the like substantially in a flat plate shape. Further, the front side member 14 is formed in a closed cross-sectional shape due to flange portions 25, that are formed respectively at the left and right both end portions of the upper member 24, being joined by spot welding or the like to left and right flange portions 23 that are formed respectively at the upper end portion of the under member 22.

Note that a lower wall 32, an inner wall 34 and an outer wall 36 at the under member 22 (the front side member 14), and an upper wall 38 at the upper member 24 (the front side member 14) correspond to plural first wall portions (or wall portions). Further, in a cross-section seen from the length direction of the front side member 14, respective wall surfaces (at least inner surfaces) 32A, 34A, 36A, 38A at the lower wall 32, the inner wall 34, the outer wall 36, the upper wall 38 are formed in the shapes of curved surfaces (arc shapes) that bulge-out toward the outer sides of the front side member 14, respectively.

Further, at the front side member 14, a corner portion 33 between the lower wall 32 and the inner wall 34 and a corner portion 35 between the lower wall 32 and the outer wall 36, and a corner portion 37 between the upper wall 38 and the inner wall 34 and a corner portion 39 between the upper wall 38 and the outer wall 36 (in other words, the corner portions 37, 39 at the regions where the respective flange portions 23 and the respective flange portions 25 are joined) correspond to plural first corner portions (or corner portions).

Further, as shown in FIG. 1, the front end portion and the rear end portion (the boundary portion with the floor member 15) of the inclined portion 14A are made to be a front side bent portion 26 and a rear side bent portion 28, respectively. The front side bent portion 26 is a bent portion that is bent (or curved) so as to be convex toward the vehicle body upper side, and the rear side bent portion 28 is a bent portion that is bent (or curved) so as to be convex toward the vehicle body lower side.

Accordingly, when load that is directed toward the vehicle body rear side is inputted to the front end portion of the front side member 14 at the time of a front collision of the vehicle 12 or the like, the front side bent portion 26 bendingly deforms toward the vehicle body upper side with the maximally bent portion (or maximally curved portion) thereof being the starting point of the deformation, and the rear side bent portion 28 bendingly deforms toward the vehicle body lower side with the maximally bent portion (or maximally curved portion) thereof being the starting point of the deformation.

Namely, at the front side bent portion 26, the under member 22 side (the lower wall 32) of the front side member 14 is the wall portion at the compressive deformation side (the stress concentration side), and the upper member 24 side (the upper wall 38) is the wall portion at the tensile deformation side. Further, at the rear side bent portion 28, the upper member 24 side (the upper wall 38) of the front side member 14 is the wall portion at the compressive deformation side (the stress concentration side), and the under member 22 side (the lower wall 32) is the wall portion at the tensile deformation side.

Further, a reinforcing member 40, that is molded from a fiber reinforced resin material (FRP), e.g., a glass fiber reinforced resin material (GFRP) or a carbon fiber reinforced resin material (CFRP), is disposed within the closed cross-sectional shape of the front side bent portion 26 and of the rear side bent portion 28. Note that, in FIG. 2 and drawings thereafter, explanation is given by using mainly the reinforcing member 40, that is disposed within the front side bent portion 26, as an example. Further, the reinforcing member 40 is disposed also at the front side bent portion and the rear side bent portion of the rear floor side member 16.

As shown in FIG. 2 and FIG. 3, the reinforcing member 40 is formed in a closed cross-sectional shape (an angular tube shape) whose length direction is the extending direction of the front side member 14, and is bent (curved) along the shape of the front side bent portion 26. Further, this reinforcing member 40 has a wall portion 42 that faces the lower wall 32, a wall portion 44 that faces the inner wall 34, a wall portion 46 that faces the outer wall 36, and a wall portion 48 that faces the upper wall 38.

Moreover, as seen in a cross-section viewed from the length direction of the front side member 14 (the reinforcing member 40), respective wall surfaces (at least outer surfaces) 42A, 44A, 46A, 48A at the respective wall portions 42, 44, 46, 48 are formed in curved surface shapes (arc shapes) that are recessed toward the inner side (the axially central side) of the front side member 14 (the reinforcing member 40), respectively.

Further, the reinforcing member 40 has a corner portion 43 between the wall portion 42 and the wall portion 44, a corner portion 45 between the wall portion 42 and the wall portion 46, a corner portion 47 between the wall portion 48 and the wall portion 44, and a corner portion 49 between the wall portion 48 and the wall portion 46. Namely, the respective wall portions 42, 44, 46, 48 correspond to plural second wall portions at the reinforcing member 40, and the respective corner portions 43, 45, 47, 49 correspond to plural second corner portions at the reinforcing member 40.

Further, the reinforcing member 40 is disposed within the closed cross-sectional shape of the front side member 14, such that the respective corner portions 43, 45, 47, 49 contact the respective corner portions 33, 35, 37, 39, respectively. Due thereto, the respective wall portions 42, 44, 46, 48 (the respective wall surfaces 42A, 44A, 46A, 48A) of the reinforcing member 40 face the lower wall 32, the inner wall 34, the outer wall 36, the upper wall 38 (the respective wall surfaces 32A, 34A, 36A, 38A) of the front side member 14 respectively, and form plural (four in this case) closed cross-sectional shapes.

Namely, the four closed cross-sectional shapes are respectively structured by curved surfaces. At the respective closed cross-sectional shapes that are structured by curved surfaces, it is easy for the stresses, that are applied to the lower wall 32, the inner wall 34, the outer wall 36, the upper wall 38 and the respective wall portions 42, 44, 46, 48 that are the curved surfaces thereof, to be dispersed, and therefore, the respective closed cross-sectional shapes have the characteristic of being difficult to deform (the respective closed cross-sectional shapes themselves are rigid). Accordingly, the yield strength with respect to bending deformation of the front side bent portion 26 and the rear side bent portion 28 in which the reinforcing members 40 are provided is improved.

Further, the curvatures of the respective wall portions 42, 44, 46, 48 of the reinforcing member 40 are made to be the same as the curvatures of the lower wall 32, the inner wall 34, the outer wall 36, the upper wall 38 of the front side member 14 that face them respectively, or are made to be greater than those. This is because, the greater the curvature of the curved surface, the easier it is for stress to be dispersed, and the harder it is to deform. Accordingly, at the reinforcing member 40, it is desirable that the wall portion 48 whose curvature is greatest be disposed at the tensile deformation side (the upper member 24 side in the case of the front side bent portion 26).

Further, the respective corner portions 43, 45, 47, 49 of the reinforcing member 40 may be structured so as to be adhered to the respective corner portions 33, 35, 37, 39 of the front side member 14 by an adhesive (e.g., an adhesive for structures that has high adhesive strength). Moreover, this reinforcing member 40 has a reinforcing rib 52 that integrally connects the wall portion 42 and the wall portion 48 that face one another. This reinforcing rib 52 is formed in a substantial flat plate shape whose length direction is the extending direction of the front side member 14 (the reinforcing member 40), and suppresses cross-sectional deformation of the reinforcing member 40.

In detail, this reinforcing rib 52 improves the yield strength with respect to bending deformation and crushing (buckling) deformation of the reinforcing member 40 in the vertical direction. Note that the reinforcing rib 52 is not limited to the illustrated form. For example, the reinforcing rib 52 may be provided so as to integrally connect the wall portion 44 and the wall portion 46 that face one another, provided that the reinforcing rib 52 improves the yield strength of the reinforcing member 40 with respect to bending deformation and crushing deformation in the left-right direction.

Further, for example, the reinforcing rib 52 may be provided so as to integrally connect respectively the wall portion 42 and the wall portion 48 that face one another and the wall portion 44 and the wall portion 46 that face one another (the reinforcing rib 52 may be formed in a cross-shape in cross-section), provided that the reinforcing rib 52 improves the yield strength of the reinforcing member 40 with respect to bending deformation and crushing deformation in the vertical direction and the left-right direction. Namely, it suffices for the reinforcing rib 52 to be provided along the direction in which it desired to suppress bending deformation and crushing deformation of the reinforcing member 40.

Accordingly, for example, the reinforcing rib 52 may be provided so as to integrally connect the corner portion 43 and the corner portion 49 that face one another, or the reinforcing rib 52 may be provided so as to integrally connect the corner portion 45 and the corner portion 47 that face one another. Further, for example, the reinforcing rib 52 may be provided so as to integrally connect respectively the corner portion 43 and the corner portion 49 that face one another and the corner portion 45 and the corner portion 47 that face one another (the reinforcing rib 52 may be formed in a cross-shape in cross-section).

Further, as an example, the reinforcing member 40 is manufactured by injection molding, and is molded by a fiber reinforced resin material being injected-in from a gate of a metal mold (not illustrated) that corresponds to the vehicle transverse direction central portion at a length direction one end portion side. Due thereto, the orientations of fibers F at the respective wall portions 42, 44, 46, 48 and the reinforcing rib 52 substantially run along the extending directions thereof (the length direction of the front side member 14).

Operation of the frame structure 10 of the vehicle 12 relating to the first embodiment that is structured as described above is described next.

Supporting portions, that support unillustrated suspension members in states of hanging-down, and engine mounts, that support an unillustrated engine and transmission (power unit) in states of hanging-down, are provided at the straight portions, that are further toward the vehicle body front side than the front side bent portions 26, of the front side members 14. Therefore, while the vehicle 12 is traveling, due to vibrations that arise at the vehicle 12, load that is directed toward the vehicle body lower side is inputted to the straight portions of the front side members 14 via the supporting portions and the engine mounts.

Here, the front side bent portion 26 is a region that is, in advance, formed so as to be bent (or curved), and is a region that becomes a starting point of deformation. Accordingly, due to input of the aforementioned load, there are cases in which the front side bent portion 26 is elastically deformed so as to bend, and, when the amount of this elastic deformation increases, the rigidity of the vehicle body deteriorates, and vibration and noise are generated at the vehicle 12, and the handling stability performance of the vehicle 12 deteriorates.

However, as described above, the reinforcing member 40 is provided at the front side bent portion 26. Namely, the reinforcing member 40 is provided within the closed cross-sectional shape at the front side bent portion 26 of the front side member 14 in a state in which the respective corner portions 43, 45, 47, 49 of the reinforcing member 40 contact the respective corner portions 33, 35, 37, 39 at the front side bent portion 26 of the front side member 14 (see FIG. 3).

Due thereto, four closed cross-sectional shapes are formed by the lower wall 32, the inner wall 34, the outer wall 36, the upper wall 38 of the front side member 14 and the respective wall portions 42, 44, 46, 48 of the reinforcing member 40. Namely, each of the four closed cross-sectional shapes is structured by two curved surfaces that face one another, and the rigidity (strength) of each of the closed cross-sectional shapes themselves is improved.

Accordingly, even if the front side bent portion 26 starts to elastically deform so as to bend upward, due to the four closed cross-sectional shapes that are structured by the front side member 14 and the reinforcing member 40, the stresses that are applied to the lower wall 32, the inner wall 34, the outer wall 36, the upper wall 38 and the respective wall portions 42, 44, 46, 48 can be dispersed, and the yield strength of the front side member 14 with respect to being elastically deformed upward can be improved, and therefore, a decrease in the rigidity of the vehicle body can be suppressed.

Moreover, within the closed cross-sectional shape at the reinforcing member 40, the reinforcing rib 52, that is substantially flat-plate-shaped and that integrally connects at least the wall portion 42 and the wall portion 48, is provided so as to span over the entire length direction of the reinforcing member 40, and further, the orientations of the fibers F at the respective wall portions 42, 44, 46, 48 and the reinforcing rib 52 are made to be the extending direction of the reinforcing member 40 (see FIG. 2). Therefore, a strong reaction force with respect to tensile force that arises at the wall portion 48 in particular can be generated.

Accordingly, the strength (rigidity) of the elastic deformation region of the front side bent portion 26 at the front side member 14 of course can improve the strength (rigidity) of the plastic deformation region, and elastic deformation that is such that the front side bent portion 26 bends can be suppressed. Accordingly, while the vehicle 12 is traveling, vibration and noise that are generated at the vehicle 12, and further, a deterioration in the handling stability performance of the vehicle 12, can be suppressed or prevented.

On the other hand, in a case in which the vehicle 12 front-collides (full-overlap collides or offset collides) with an unillustrated obstacle, the collision load thereof is inputted to the front end portions of the front side members 14 via an unillustrated front bumper reinforcement and crush boxes.

Here, the front side bent portion 26 and the rear side bent portion 28 are regions that are, in advance, formed so as to be bent (or curved), and the maximally bent portions (or maximally curved portions) thereof are deformation starting points. However, as described above, the reinforcing members 40 are provided at the front side bent portion 26 and the rear side bent portion 28 (the maximally bent portions) of the front side member 14, and the strength (rigidity) of the elastic deformation regions and the plastic deformation regions thereof is improved.

Namely, the four closed cross-sectional shapes are formed by the lower wall 32, the inner wall 34, the outer wall 36, the upper wall 38 of the front side member 14 and the respective wall portions 42, 44, 46, 48 of the reinforcing member 40. Further, these four closed cross-sectional shapes are respectively structured by curved surfaces, and the rigidities (strengths) of the respective closed cross-sectional shapes themselves are improved.

Accordingly, even if bending moment force (load), that is such that the front side member 14 bends in the vertical direction with the front side bent portion 26 and the rear side bent portion 28 (the maximally bent portions) as the deformation starting points, is inputted to the front end portion of the front side member 14, due to the four closed cross-sectional shapes that are structured by the reinforcing members 40, the yield strength of the front side member 14 with respect to being elastically deformed and plastically deformed upward or downward can be greatly improved.

Namely, in accordance with this reinforcing member 40, the bending deformation (plastic deformation), whose deformation starting point is the front side bent portion 26 or the rear side bent portion 28 (a maximally bent portion) of the front side member 14, can be delayed, and can be effectively suppressed (mitigated). Further, after the bending deformation (plastic deformation) as well, cross-sectional collapse at the front side bent portion 26 or the rear side bent portion 28 of the front side member 14 can be suppressed by the yield strength of the four closed cross-sectional shapes.

Further, the reinforcing rib 52, that is substantially flat-plate-shaped and that integrally connects at least the wall portion 42 and the wall portion 48, is provided within the closed cross-sectional shape of the reinforcing member 40 over the entire length direction of the reinforcing member 40. Therefore, the yield strength of the front side member 14 (the reinforcing member 40) with respect to being elastically deformed and plastically deformed upward or downward can be improved more.

Further, the orientation of the fibers F at the respective wall portions 42, 44, 46, 48 and the reinforcing rib 52 is made to be the extending direction of the reinforcing member 40, i.e., the extending direction (length direction) of the front side member 14, and runs along the direction of input of load. Due thereto as well, the yield strength of the front side member 14 (the reinforcing member 40) with respect to being elastically deformed and plastically deformed upward or downward can be improved more.

Accordingly, at the time of a front collision of the vehicle 12, the portion of the front side member 14, that is further toward the vehicle body front side than the front side bent portion 26, can be compressively deformed (crushed) efficiently in the axial direction thereof (the vehicle body longitudinal direction), and the collision load that is inputted can be absorbed efficiently (the energy absorption amount can be increased) at the straight portion of the front side member 14.

Namely, due to the reinforcing member 40 that has such a structure, the front side bent portion 26 and the rear side bent portion 28, at which it is predicted that bending deformation will occur, can be locally reinforced efficiently. Therefore, a deterioration in the collision safety performance, that accompanies poor compressive deformation of the front side member 14 in the axial direction and an increase in the amount of bending deformation of the front side bent portion 26 and the rear side bent portion 28, can be suppressed or prevented.

Accordingly, at the time of a front collision of the vehicle 12, deformation of the vehicle cabin 20 can be suppressed or prevented, and the space of the vehicle cabin 20 in the longitudinal direction can be ensured to be wide. Further, because this reinforcing member 40 is made of a fiber reinforced resin and is made to be light-weight, the fuel economy can be improved and exhaust gas can be reduced, as compared with a structure that is reinforced by a metal plate or the like.

Moreover, because this reinforcing member 40 can be adopted easily by using existing facilities and processes, even though there is a structure in which the reinforcing member 40 is provided within the front side member 14, a deterioration in the produceability thereof is suppressed. Note that operation in a case in which the reinforcing member 40 is provided at the front side bent portion and the rear side bent portion of the rear floor side member 16 also is similar.

Second Embodiment

The frame structure 10 of the vehicle 12 relating to a second embodiment is described next. Note that regions that are equivalent to those of the above-described first embodiment are denoted by the same reference numerals, and detailed description thereof (including common operation) is omitted as appropriate.

Figure 4:
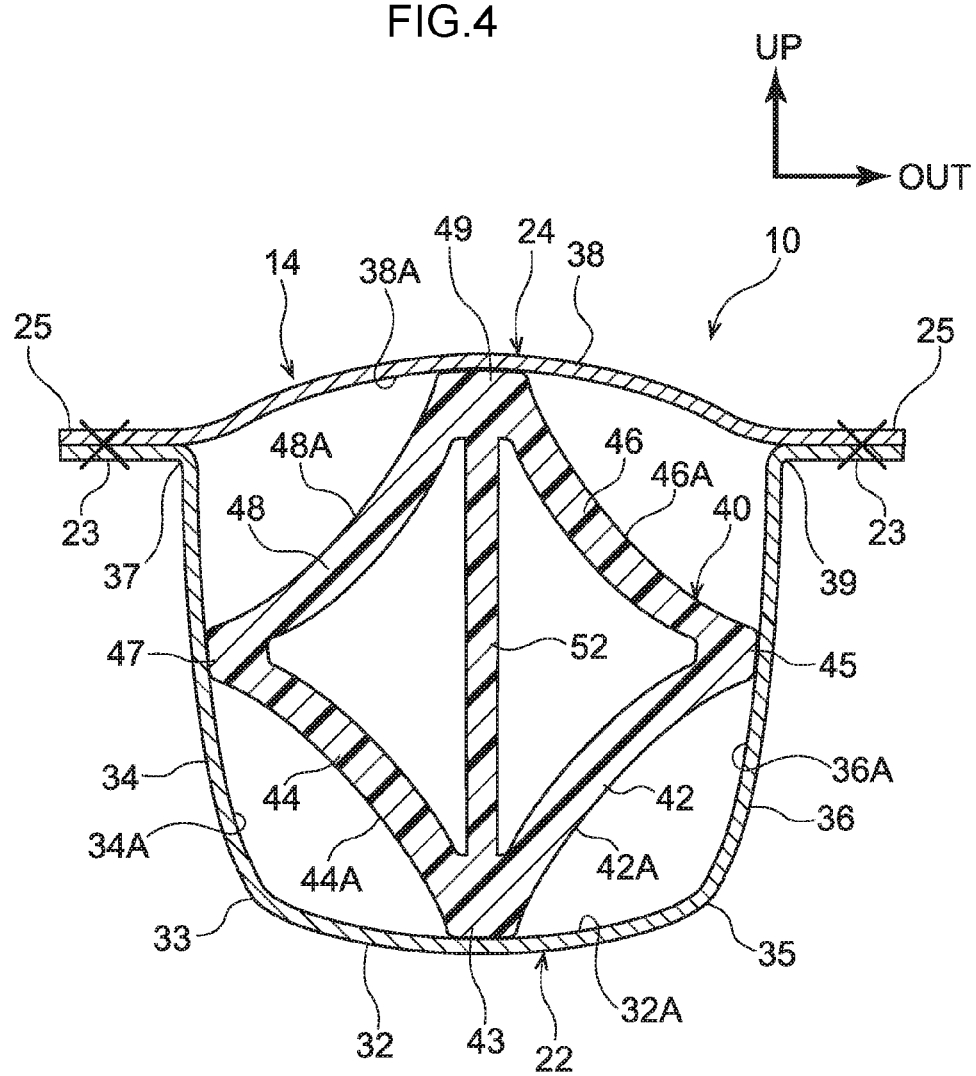
FIG. 4 is a cross-sectional view showing the front side member and the reinforcing member relating to a second embodiment.

As shown in FIG. 4, in the second embodiment, the reinforcing member 40 of the first embodiment is disposed by being rotated 90° counterclockwise such that, as seen from the length direction of the front side member 14, the respective corner portions 43, 45, 47, 49 of the reinforcing member 40 contact (or are joined by an adhesive to) the left-right direction substantially central portions or the vertical direction substantially central portions of the lower wall 32, the outer wall 36, the inner wall 34, the upper wall 38 of the front side member, respectively.

Namely, plural (four in this case) closed cross-sectional shapes are formed by the respective wall portions 42, 44, 46, 48 of the reinforcing member 40 facing the respective corner portions 35, 33, 39, 37 of the front side member 14, respectively. Further, at this reinforcing member 40, the corner portions 43, 49, that contact (or are joined to) the lower wall 32 and the upper wall 38 and that face one another, are connected integrally by the reinforcing rib 52.

In this way, the rigidities (strengths) of these four closed cross-sectional shapes themselves can be improved even more when the respective corner portions 43, 45, 47, 49, that are respective ridgeline portions of the reinforcing member 40 that are hardest to deform with respect to bendingly-deforming load, face the lower wall 32, the outer wall 36, the inner wall 34, the upper wall 38, and, the respective corner portions 33, 35, 37, 39 that are the respective ridgeline portions of the front side member 14 are included within the four closed cross-sectional shapes.

Namely, the yield strength of the front side member 14 (the reinforcing member 40) with respect to bending deformation and crushing deformation in the vertical direction and the left-right direction can be improved even more. Accordingly, bending deformation (plastic deformation) of the front side member 14, whose deformation starting points are the front side bent portion 26 and the rear side bent portion 28 (the maximally bent portions), can be suppressed more, and cross-sectional collapse thereof can be suppressed more.

Figure 5:
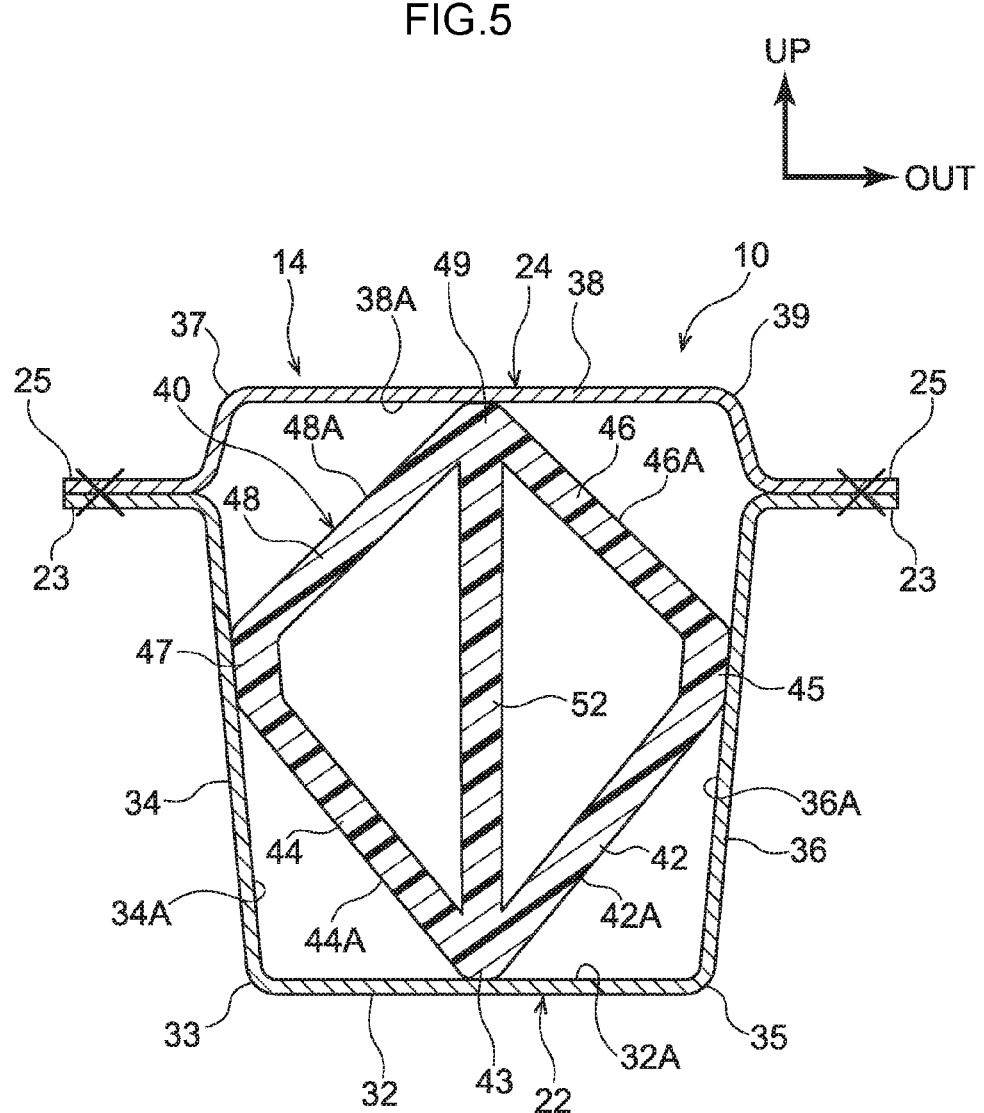
FIG. 5 is a cross-sectional view showing the front side member and the reinforcing member relating to the second embodiment.

Note that, in the case of this second embodiment, as shown in FIG. 5, the respective wall surfaces 32A, 34A, 36A, 38A of the lower wall 32, the inner wall 34, the outer wall 36, the upper wall 38 of the front side member 14 do not have to be formed in the shapes of curved surfaces that bulge-out toward the outer sides. Further, the respective wall surfaces 42A, 44A, 46A, 48A of the respective wall portions 42, 44, 46, 48 of the reinforcing member 40 also do not have to be formed in the shapes of curved surfaces that are recessed toward the inner side of the front side member 14.

Third Embodiment

The frame structure 10 of the vehicle 12 relating to a third embodiment is described next. Note that regions that are equivalent to those of the above-described first embodiment and second embodiment are denoted by the same reference numerals, and detailed description thereof (including common operation) is omitted as appropriate.

Figure 6:
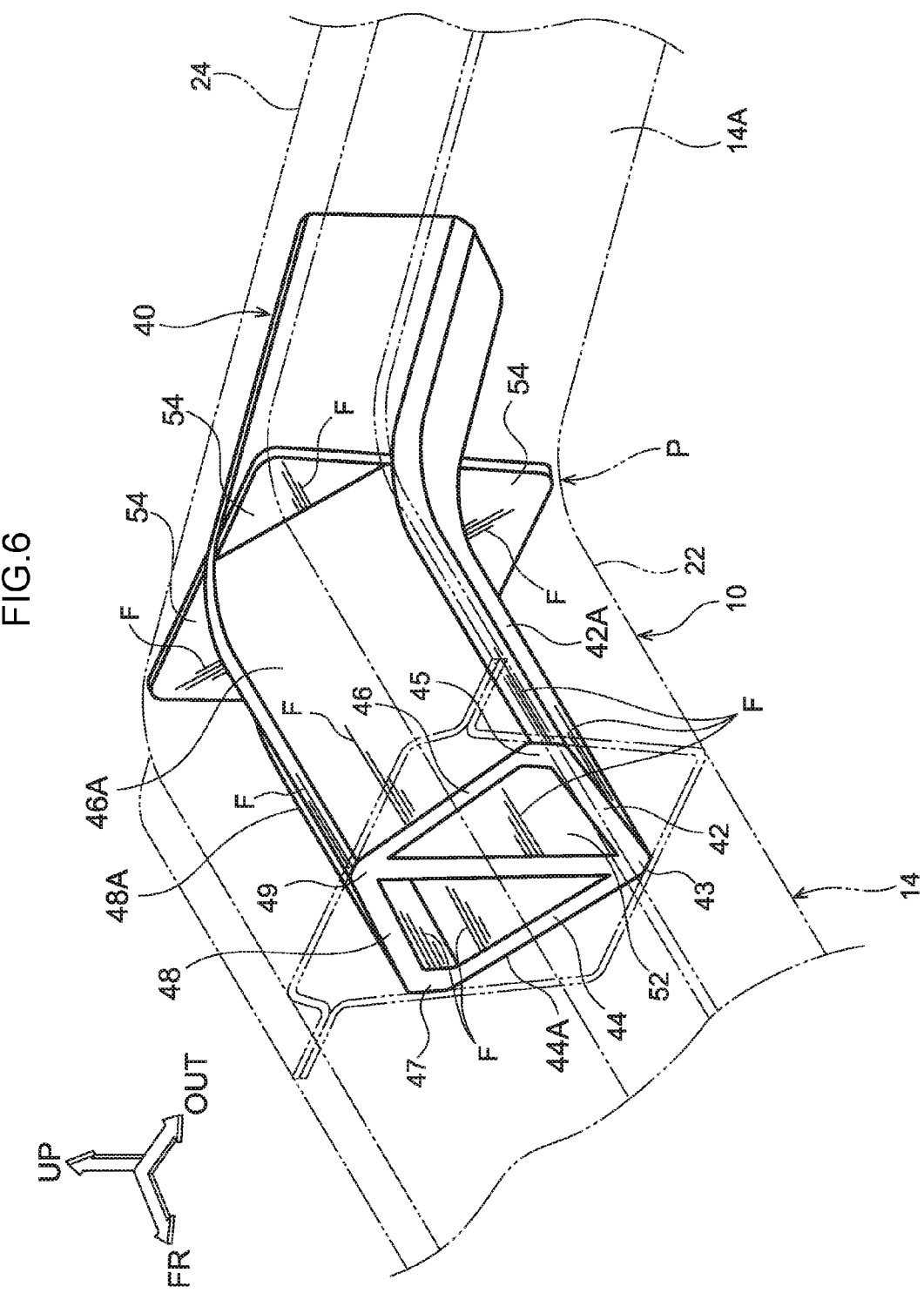
FIG. 6 is a perspective view showing the front side member and the reinforcing member relating to a third embodiment.
Figure 7:
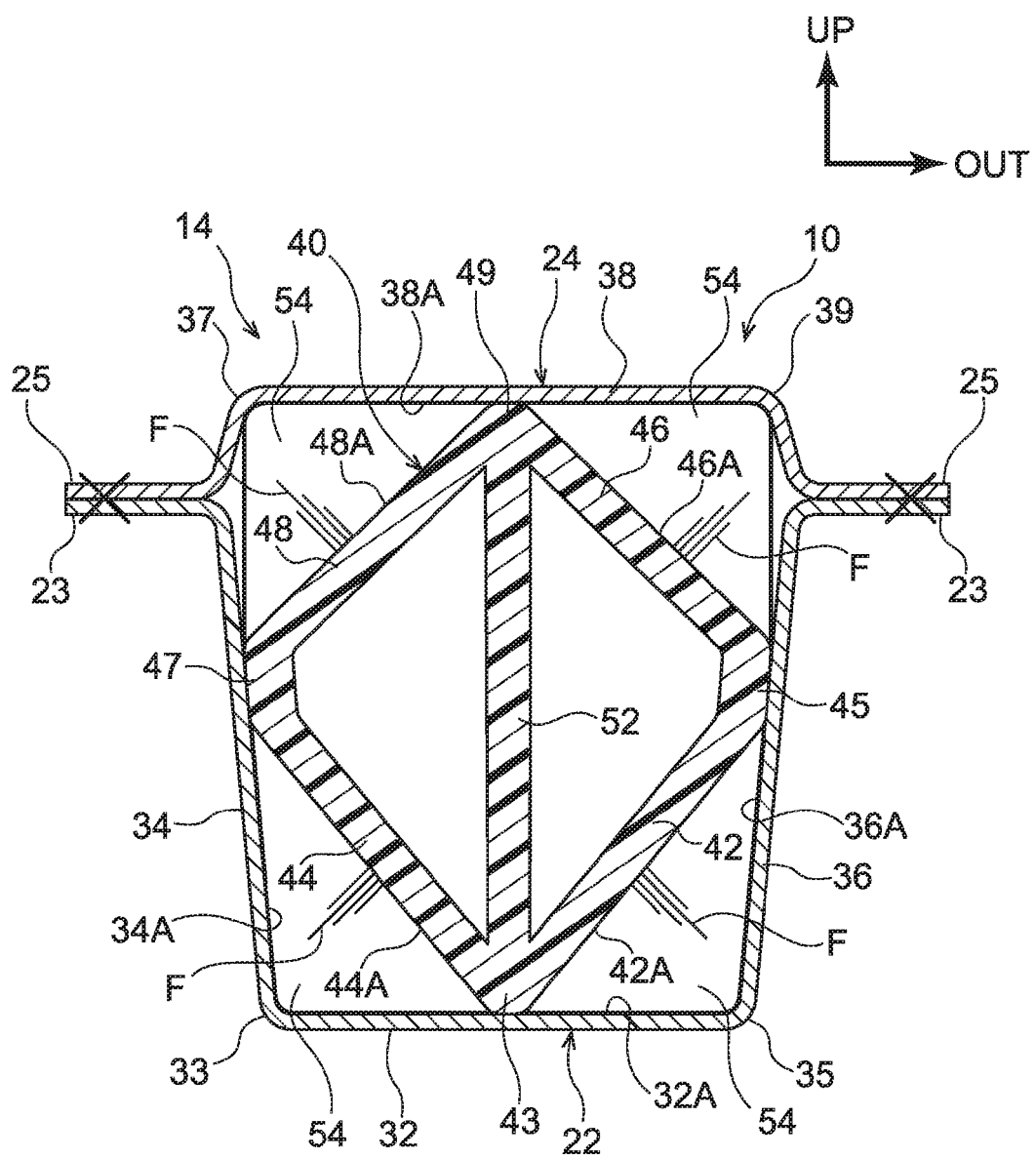
FIG. 7 is a cross-sectional view showing the front side member and the reinforcing member relating to the third embodiment.

As shown in FIG. 6 and FIG. 7, in this third embodiment, plural (four in this case) partitioning wall ribs 54, that are near to or abut at least the respective corner portions 35, 33, 39, 37 of the front side member 14 respectively, are provided integrally at predetermined positions of the wall surfaces 42A, 44A, 46A, 48A of the respective wall portions 42, 44, 46, 48 of the reinforcing member 40, as seen from the length direction of the front side member 14.

To explain in detail, as seen from the length direction of the front side member 14, the respective partitioning wall ribs 54 are formed in substantially triangular shapes that are substantially the same as the closed cross-sectional shapes that are structured by the respective wall portions 42, 44, 46, 48 and the respective corner portions 35, 33, 39, 37, and stand erect perpendicularly at the respective wall surfaces 42A, 44A, 46A, 48A of the respective wall portions 42, 44, 46, 48.

Further, the end surfaces at the peripheral edge portions of the respective partitioning wall ribs 54 are near to or contact the respective wall surfaces 32A, 34A, 36A, 38A of the lower wall 32, the inner wall 34, the outer wall 36, the upper wall 38 of the front side member 14, respectively. Accordingly, due to the respective partitioning wall ribs 54, cross-sectional deformation at the respective corner portions 35, 33, 39, 37 of the front side member 14 (concave deformation that is such that the respective corner portions 35, 33, 39, 37 approach the respective wall surfaces 42A, 44A, 46A, 48A) can be suppressed or prevented.

In particular, as shown in FIG. 6, when the respective partitioning wall ribs 54 stand erect at a maximally bent portion (or maximally curved portion) P at the front side bent portion 26 (the same holds for the rear side bent portion 28 as well), when the vehicle 12 front collides or the like, bending deformation, that is generated due to input of load and whose starting point is the maximally bent portion P of the front side member 14, can be effectively suppressed or prevented. Note that positions that are offset slightly in the longitudinal direction from the exact maximally bent portion (or maximally curved portion) also are included as the "maximally bent portion (or maximally curved portion)" of the present embodiment.

Further, the respective partitioning wall ribs 54 that are illustrated are provided at one place in the length direction of the front side member 14, but, for example, may be provided so as to be apart by a predetermined interval (e.g., a uniform interval) at plural places in the length direction of the front side member 14. The strength (rigidity) of the reinforcing member 40 is improved in proportion to the number of the partitioning wall ribs 54. Further, the end surfaces at the peripheral edge portions of the respective partitioning wall ribs 52 may be joined by an adhesive to the respective wall surfaces 32A, 34A, 36A, 38A, respectively, and joining better improves the yield strength of the front side member 14 with respect to bending deformation.

Further, the orientations of the fibers F at the respective partitioning wall ribs 54 run along the directions heading from the wall surfaces 42A, 44A, 46A, 48A of the respective wall portions 42, 44, 46, 48 toward the respective corner portions 35, 33, 39, 37. Due thereto, the strength (rigidity) of the respective partitioning wall ribs 54 is improved, and the aforementioned cross-sectional deformation is further suppressed or prevented. Further, although the plate thickness of the respective partitioning wall ribs 54 is not particularly limited, it suffices for the plate thickness of the respective partitioning wall ribs 54 to be, for example, equal to the plate thickness of the respective wall portions 42, 44, 46, 48 or the plate thickness of the reinforcing ribs 52.

Fourth Embodiment

The frame structure 10 of the vehicle 12 relating to a fourth embodiment is described next. Note that regions that are equivalent to those of the above-described first embodiment through third embodiment are denoted by the same reference numerals, and detailed description thereof (including common operation) is omitted as appropriate.

Figure 8:
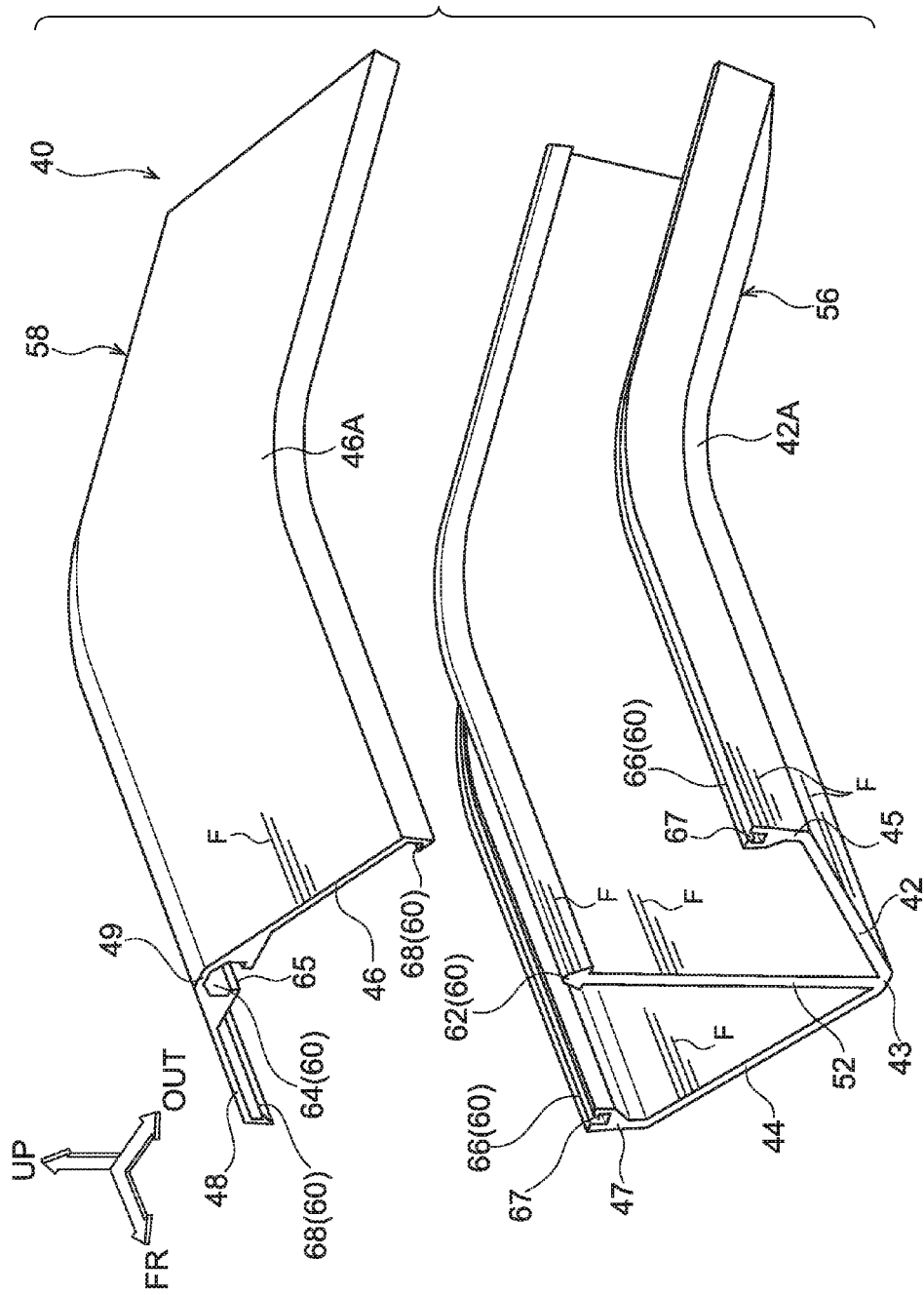
FIG. 8 is an exploded perspective view of the reinforcing member relating to a fourth embodiment.
Figure 9:
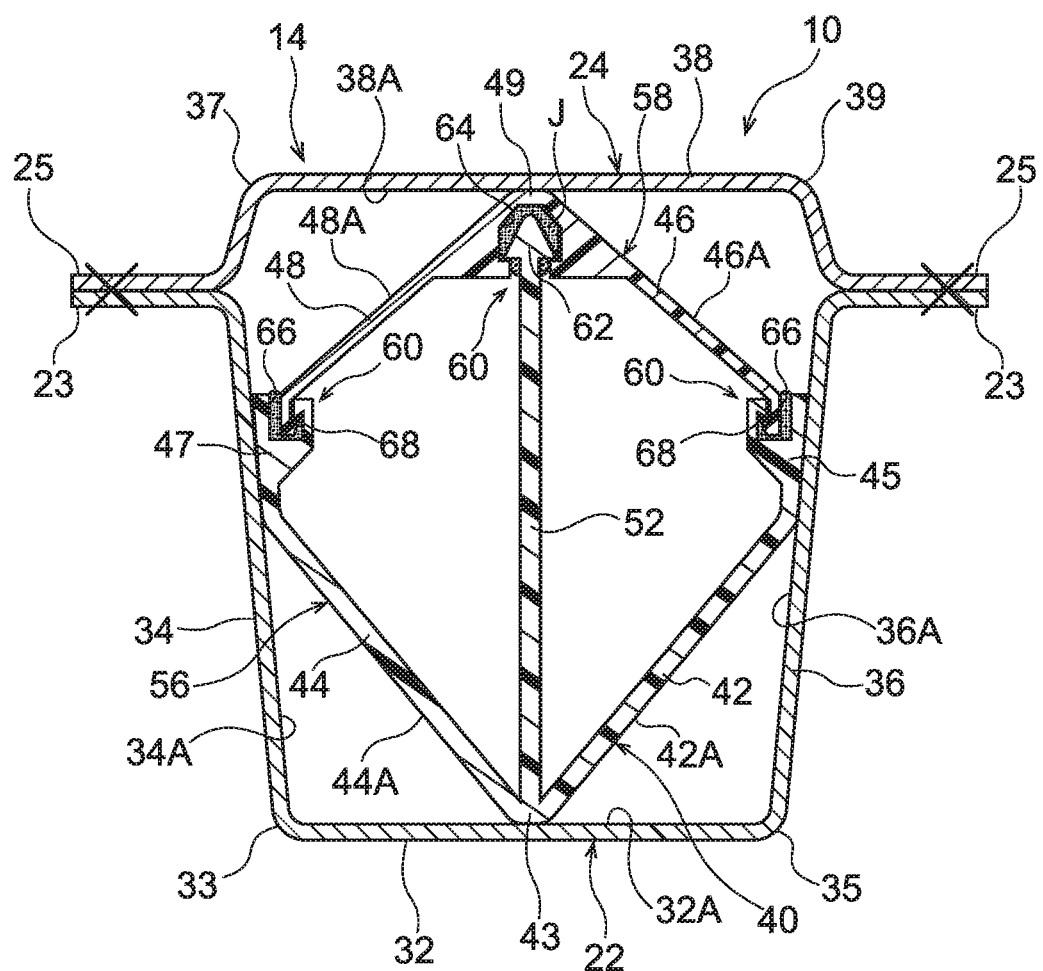
FIG. 9 is a cross-sectional view showing the front side member and the reinforcing member relating to the fourth embodiment.

As shown in FIG. 8 and FIG. 9, in this fourth embodiment, the reinforcing member 40 is divided into the first member 56 and the second member 58 that form a closed cross-sectional shape by being fit-together. To describe in detail, the first member 56 has the wall portions 42, 44 and the reinforcing rib 52. Further, the second member 58 has the wall portions 46, 48.

Figure 10A:
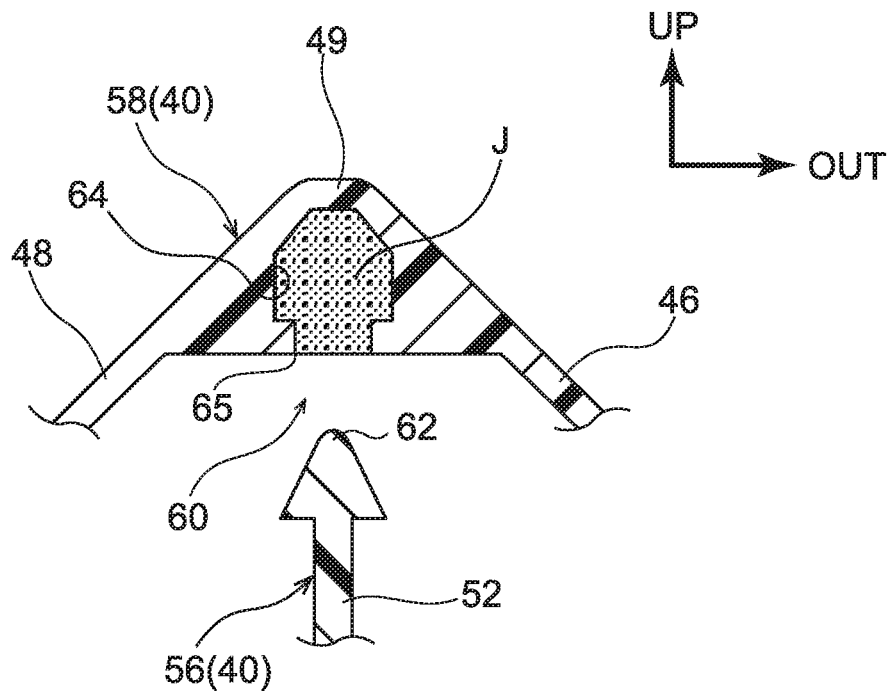
FIG. 10A is an explanatory drawing showing a state before fitting-together of the reinforcing member relating to the fourth embodiment.
Figure 10B:
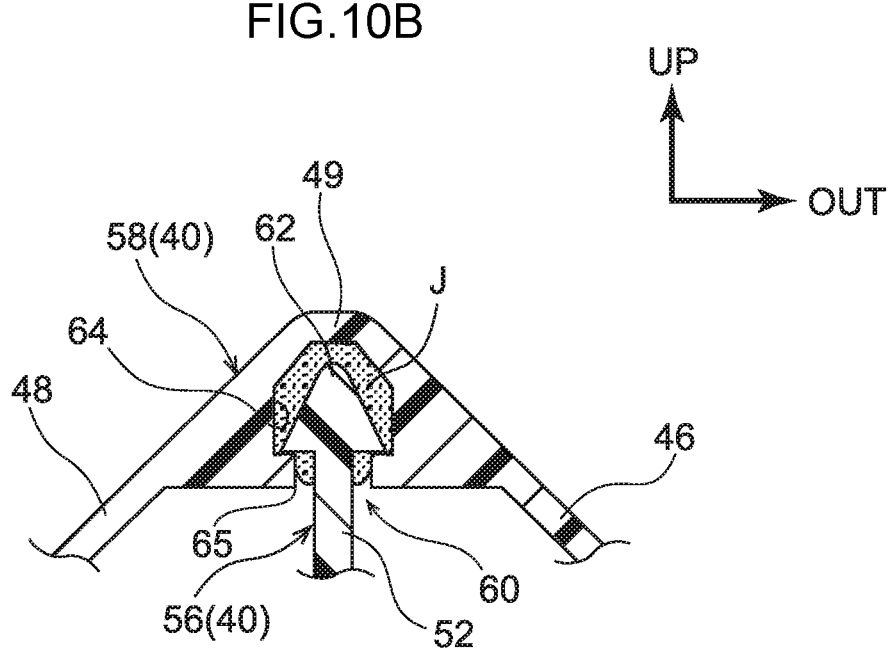
FIG. 10B is an explanatory drawing showing a state after fitting-together of the reinforcing member relating to the fourth embodiment.

Moreover, the first member 56 and the second member 58 have fit-together mechanisms 60 at the respective corner portions 45, 47, 49. For example, as shown in FIG. 10, a fitting portion 62, that is substantially isosceles triangle shaped (or substantially equilateral triangle shaped) as seen from the length direction of the front side member 14, is formed at the upper end portion (the free end portion) of the reinforcing rib 52 at the first member 56, and a fit-into portion 64 that is concave and opens toward the lower side is formed in the corner portion 49 of the second member 58.

Further, the width (the interval in the direction orthogonal to the length direction of the reinforcing member 40) of an opening portion 65 that is formed at the lower end portion of the fit-into portion 64 is formed to be smaller than the maximum width (the thickness in the direction orthogonal to the length direction of the reinforcing member 40) at the lower end portion of the fitting portion 62. Accordingly, as the fitting portion 62 advances into the fit-into portion 64 from beneath, the lower end portion of the fit-into portion 64 that forms the opening portion 65 elastically deforms and receives the fitting portion 62, and thereafter, due to the lower end portion of the fit-into portion 64 being restored, the fitting portion 62 is anchored so as to be unable to come out.

Figure 11A:
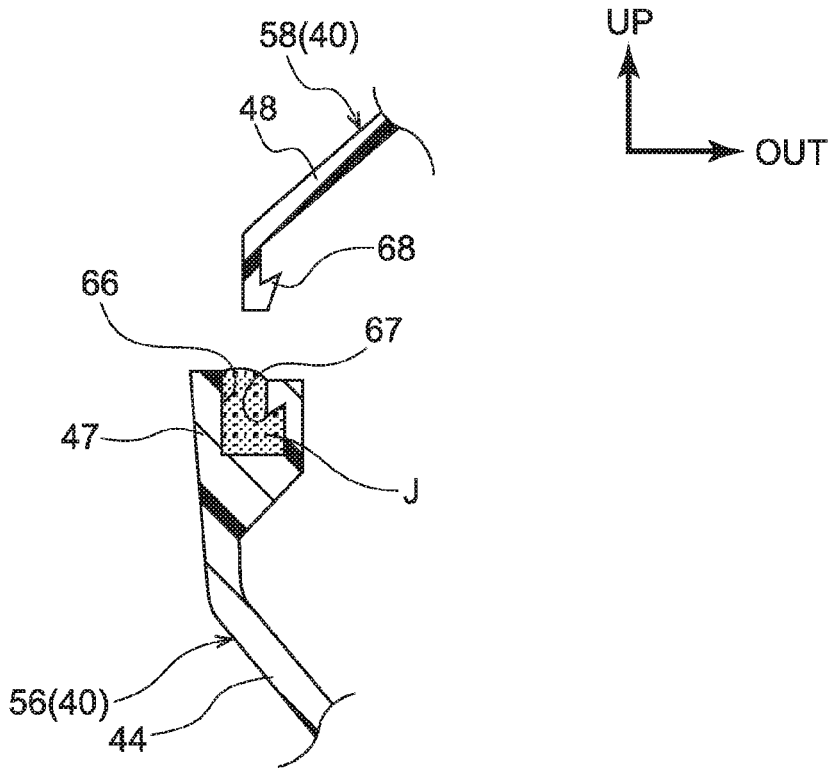
FIG. 11A is an explanatory drawing showing a state before fitting-together of the reinforcing member relating to the fourth embodiment.
Figure 11B:
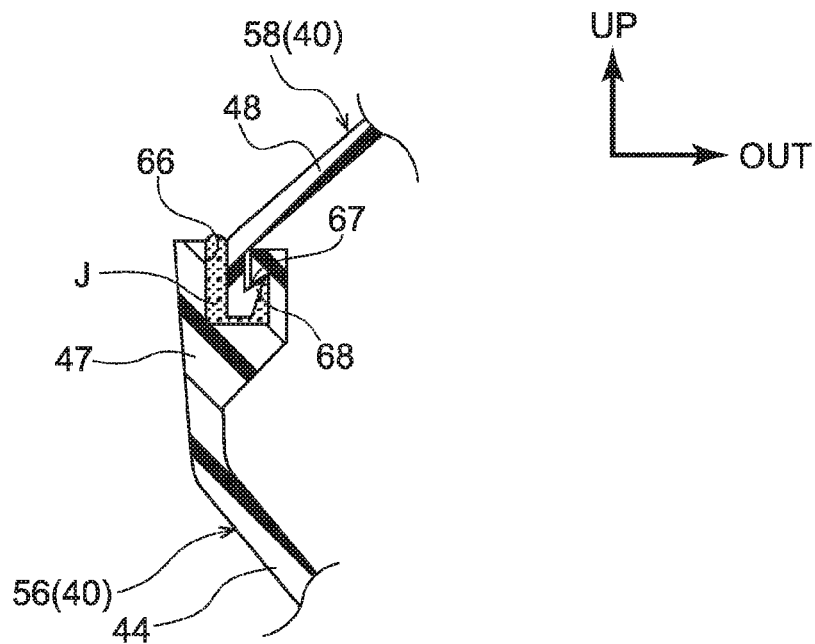
FIG. 11B is an explanatory drawing showing a state after fitting-together of the reinforcing member relating to the fourth embodiment.

Further, for example, as shown in FIG. 11, a fit-into portion 66, that is concave and opens toward the upper side, is formed in the corner portion 47 at the first member 56, and a claw portion 67 that projects-out toward the lower side is formed integrally with the inner side wall of this fit-into portion 66 interior. Further, a claw portion 68, that projects-out toward the upper side and serves as a fitting portion, is formed integrally with the lower end portion (the free end portion) of the wall portion 48 at the second member 58.

Accordingly, due to the claw portion 68 being inserted into the fit-into portion 66 from above and being anchored on the claw portion 67, the claw portion 68 cannot come-out from the fit-into portion 66. Note that the fit-into portion 66 (the claw portion 67) that is similar is formed also at the corner portion 45 at the first member 56, and the claw portion 68 that is similar is formed also at the wall portion 46 at the second member 58, and the claw portion 68 is anchored on the claw portion 67 as described above.

Further, as shown in FIG. 10 and FIG. 11, there may be a structure in which an adhesive J is filled-in in advance into the fit-into portions 64, 66, and, when the fitting portion 62 and the claw portions 68 are anchored on (fit-together with) the fit-into portion 64 and the fit-into portions 66 (the claw portions 67), the fitting portion 62 and the claw portions 68 are joined to the fit-into portion 64 and the fit-into portions 66. In this case, the strength (rigidity) of the respective corner portions 45, 47, 49 of the reinforcing member 40 can be improved more.

Further, due to the respective corner portions 43, 45, 47 being joined by an adhesive to the lower wall 32, the outer wall 36, the inner wall 34 respectively, the first member 56 is disposed within the under member 22 in advance. Further, due to the corner portion 49 being joined by an adhesive to the upper wall 38, the second member 58 is disposed within the upper member 24 in advance.

Due thereto, accompanying the joining of the upper member 24 to the under member 22, the first member 56 and the second member 58 are fit-together with one another, and the reinforcing member 40 that has a closed cross-sectional shape is formed. Namely, in accordance with this fourth embodiment, the ability to incorporate the reinforcing member 40 into the front side member 14 is improved, and a deterioration in produceability is suppressed more.

Fifth Embodiment

Finally, the frame structure 10 of the vehicle 12 relating to a fifth embodiment is described next. Note that regions that are equivalent to those of the above-described first embodiment through fourth embodiment are denoted by the same reference numerals, and detailed description thereof (including common operation) is omitted as appropriate.

As shown in FIG. 12, at a reinforcing member 50 relating to this fifth embodiment, the orientation of the fibers F differs from those of the reinforcing members 40 relating to the above-described first embodiment through fourth embodiment. Namely, at this reinforcing member 50, the orientation of the fibers F runs along the peripheral direction, and the reinforcing member 50 can be used as a bulkhead (partitioning wall) that locally reinforces, for example, only the maximally bent portion (or the maximally curved portion) of the front side member 14 that is formed in a closed cross-sectional shape.

This reinforcing member 50 also can suppress bending deformation at the front side bent portion 26 or the rear side bent portion 28. Note that this reinforcing member 50 is, for example, injection molded by a fiber reinforced resin material being injected-in from a gate of a metal mold (not illustrated) that corresponds to the vehicle body longitudinal direction central portion of the corner portion 49. Due thereto, the orientations of the fibers F at the respective wall portions 42, 44, 46, 48 substantially run along the peripheral directions thereof (directions orthogonal to the length direction of the front side member 14).

Figure 12A:
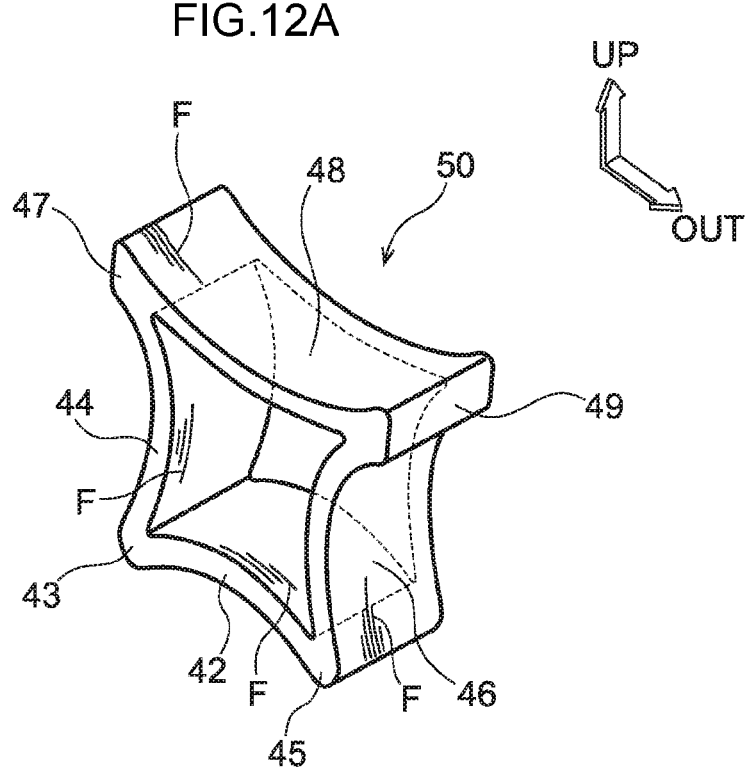
FIG. 12A is a perspective view of a reinforcing member relating to a fifth embodiment.
Figure 12B:
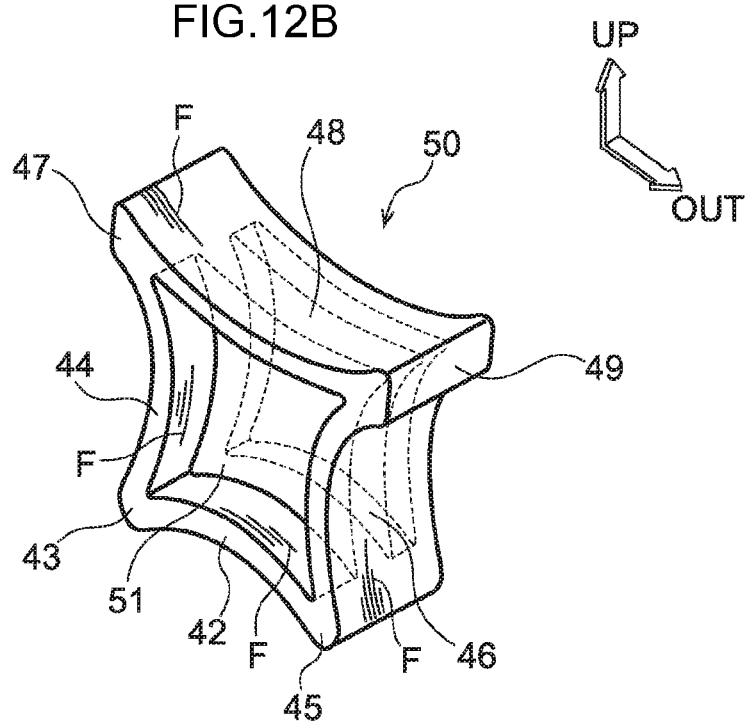
FIG. 12B is a perspective view showing a modified example of the reinforcing member relating to the fifth embodiment.

Further, this reinforcing member 50 may be formed in the shape of a tube as shown in FIG. 12A, or may be formed in a shape in which the interior of a tube shape is blocked by a thin plate portion 51 such as shown in FIG. 12B. The reinforcing member 50 that has the thin plate portion 51 can improve the reinforcing effect more.

Moreover, the reinforcing rib 52 such as that of the above-described first embodiment through fourth embodiment may be provided at this reinforcing member 50.

Conversely, there may be a structure in which, at the reinforcing member 40 of the above-described first embodiment through fourth embodiment, not the reinforcing rib 52, but one of the thin plate portions 51 is provided at the maximally bent portion, or a plurality of the thin plate portions 51 are provided at a predetermined interval in the length direction (including at the maximally bent portion).

Although the frame structures 10 of a vehicle 12 relating to the present embodiments have been described above on the basis of the drawings, the frame structures 10 of a vehicle 12 relating to the present embodiments are not limited to the illustrated structures, and the design thereof can be changed appropriately within a scope that does not depart from the gist of the present invention. For example, the front side member 14 and the reinforcing members 40, 50 are not limited to structures that are formed in the substantially quadrangular tube shapes that are illustrated, and may be formed in the shapes of cylindrical tubes or in the shapes of polygonal tubes other than quadrangular tube shapes.

Further, the reinforcing members 40, 50 are not limited to structures that are provided within the front side member 14, and can be provided at all frame members at which it is predicted that bending deformation will occur at the time of a collision of the vehicle 12. Namely, the reinforcing members 40, 50 are not limited to structures that are provided at a region that is, in advance, formed so as to be bent (or curved), among the frame members that have closed cross-sectional shapes and that structure the frame of the vehicle 12.

For example, the reinforcing member 40, 50 may be provided at the interior of a center cross-member (not illustrated) that is straight and is substantially hat-shaped in cross-section and that forms a closed cross-sectional shape together with a floor panel (not illustrated), or at the interior of a center pillar 13 that extends substantially straight in the vehicle body vertical direction and whose closed cross-sectional shape is formed by an inner panel and an outer panel that are substantially hat-shaped in cross-section, or the like.

Further, the reinforcing members 40, 50 may be structures that are provided by insert molding or prepreg molding within the closed cross-sectional shape of the front side member 14 or the center pillar 13. Further, at the time of molding the reinforcing member 40, 50 (including the reinforcing rib 52 and the partitioning wall ribs 54), for example, fiber sheets may be set in advance within the metal mold such that the orientations of the fibers F become desired directions, and thereafter, the reinforcing member 40, 50 may be molded of a resin material.

Moreover, the joining of the reinforcing member 40, 50 to the front side member 14 is not limited to an adhesive, and, for example, there may be a structure in which the joining is by unillustrated bolts and nuts. In this case, there may be a structure in which the nuts are provided in advance by insert molding at the reinforcing member 40, 50.

Further, the structures of the above-described respective embodiments can be applied to one another. For example, the partitioning wall ribs 54 of the third embodiment may be made to stand erect at the respective wall portions 42, 44, 46, 48 of the first member 56 and the second member 56 of the fourth embodiment. Further, the reinforcing member 40 relating to the first embodiment may be structured so as to be divided into the first member 56 and the second member 58 and fit-together, as in the fourth embodiment.

Further, the disclosure of Japanese Patent Application NO. 2013-228598 is, in its entirety, incorporated by reference into the present specification. All publications, patent applications, and technical standards mentioned in the present specification are incorporated by reference into the present specification to the same extent as if such individual publication, patent application, or technical standard was specifically and individually indicated to be incorporated by reference.

The invention claimed is:

1. A vehicle frame structure comprising:
a frame member that is formed in a closed cross-sectional shape with a plurality of first wall portions and a plurality of first corner portions, the frame member configuring a vehicle frame; and
a reinforcing member that is made of a fiber reinforced resin, the reinforcing member being formed in a closed cross-sectional shape with a plurality of second wall portions and a plurality of second corner portions, the reinforcing member being disposed within the closed cross-sectional shape of the frame member such that the plurality of second corner portions contact the plurality of first wall portions or the plurality of first corner portions respectively, and the plurality of second wall portions facing the plurality of first wall portions or the plurality of first corner portions respectively, forming a plurality of closed cross-sectional shapes; wherein,
as seen in a cross-section viewed from a length direction of the frame member, wall surfaces of the plurality of second wall portions, that face the plurality of first wall portions or the plurality of first corner portions respectively, are formed in shapes of curved surfaces that are recessed toward an inner side of the frame member.

2. The vehicle frame structure of claim 1, wherein, as seen in a cross-section viewed from a length direction of the frame member, wall surfaces of the plurality of first wall portions, that face the plurality of second wall portions respectively or that are contacted by the plurality of second corner portions respectively, are formed in shapes of curved surfaces that bulge out toward outer sides of the frame member.

3. The vehicle frame structure of claim 1, wherein a reinforcing rib, that connects the second wall portions that face one another or the second corner portions that face one another, is provided within the closed cross-sectional shape of the reinforcing member.

4. The vehicle frame structure of claim 1, wherein, as seen from a length direction of the frame member, partitioning wall ribs, that are near to or that abut at least the plurality of first corner portions respectively, are provided at wall surfaces of the plurality of second wall portions that face the plurality of first corner portions respectively.

5. The vehicle frame structure of claim 4, wherein
the frame member has a bent portion, and
the partitioning wall ribs are provided at a region corresponding to the bent portion.

6. The vehicle frame structure of claim 1, wherein orientations of fibers at the reinforcing member run along a length direction of the frame member.

7. The vehicle frame structure of claim 4, wherein orientations of fibers at the partitioning wall ribs run along directions heading from the second wall portions toward the first corner portions.

8. The vehicle frame structure of claim 1, wherein the reinforcing member is structured by a first member and a second member that form a closed cross-sectional shape by being fit-together with one another.

9. The vehicle frame structure of claim 1, wherein:
as seen in a cross-section viewed from a length direction of the frame member, wall surfaces of the plurality of first wall portions are formed in shapes of
curved surfaces that bulge-out toward outer sides of the frame member, and wall surfaces of the plurality of second wall portions, that face the plurality of first wall portions respectively, are formed in shapes of curved surfaces that are recessed toward an inner side of the frame member, and
curvatures of the wall surfaces of the second wall portions are the same as or are greater than curvatures of the wall surfaces of the first wall portions.

* * * * *

UNITED STATES PATENT AND TRADEMARK OFFICE
CERTIFICATE OF CORRECTION

PATENT NO. : 9,868,465 B2
APPLICATION NO. : 15/030288
DATED : January 16, 2018
INVENTOR(S) : Hiroyuki Kurokawa It is certified that error appears in the above-identified patent and that said Letters Patent is hereby corrected as shown below:

Item (73) should read:

Assignee: TOYOTA JIDOSHA KABUSHIKI KAISHA, Toyota (JP)

Signed and Sealed this
Eighth Day of May, 2018

Andrei Iancu
*Director of the United States Patent and Trademark Office*